(12) United States Patent
Wycech

(10) Patent No.: US 6,237,304 B1
(45) Date of Patent: May 29, 2001

(54) LAMINATE STRUCTURAL BULKHEAD

(75) Inventor: Joseph S. Wycech, Grosse Pointe Woods, MI (US)

(73) Assignee: Henkel Corporation, Gulf Mills, PA (US)

( * ) Notice: Subject to any disclaimer, the term of this patent is extended or adjusted under 35 U.S.C. 154(b) by 0 days.

(21) Appl. No.: 09/103,032

(22) Filed: Jun. 23, 1998

Related U.S. Application Data

(60) Provisional application No. 60/053,118, filed on Jul. 18, 1997.

(51) Int. Cl.$^7$ .................................................. B62D 25/00
(52) U.S. Cl. .................. 52/731.6; 52/735.1; 52/787.12; 52/742.13; 52/745.21; 52/309.7; 52/309.11; 29/897.2; 29/530; 293/155; 296/188; 296/205; 296/194; 296/30; 428/36.5; 428/71
(58) Field of Search .............................. 52/735.1, 731.6, 52/787.1, 787.11, 787.12, 742.13, 745.21, 309.7, 309.11; 29/897.2, 530; 293/109, 155, 120, 136; 280/797; 248/647; 296/29, 30, 205, 188, 194, 189, 209, 146.6; 428/71, 36.5

(56) References Cited

U.S. PATENT DOCUMENTS

| | | | |
|---|---|---|---|
| 2,060,970 | * | 11/1936 | Belden ........................ 52/787.12 X |
| 2,327,585 | | 8/1943 | Ulrich . |
| 2,883,232 | * | 4/1959 | Olley et al. ..................... 280/797 X |
| 3,123,170 | | 3/1964 | Bryant . |
| 3,493,257 | | 2/1970 | Fitzgerald et al. . |
| 3,739,882 | * | 6/1973 | Schwenk et al. .................... 188/268 |
| 4,079,975 | * | 3/1978 | Matsuzaki et al. .............. 293/155 X |
| 4,090,734 | | 5/1978 | Inami et al. . |
| 4,238,540 | | 12/1980 | Yates et al. . |
| 4,397,490 | | 8/1983 | Evans . |
| 4,559,274 | | 12/1985 | Kloppe et al. . |

(List continued on next page.)

FOREIGN PATENT DOCUMENTS

| | | |
|---|---|---|
| 29 19 046A | 11/1980 | (DE) . |
| 90 11 147 U | 12/1990 | (DE) . |
| 4305399 | 3/1992 | (DE) . |
| 93 20 333 | 7/1994 | (DE) . |
| 0 061 131 | 9/1982 | (EP) . |
| 0321433 | 6/1989 | (EP) . |
| 0363573 | 6/1989 | (EP) . |
| 0 414 302 A1 | 2/1991 | (EP) . |
| 0 453 777 A2 | 10/1991 | (EP) . |
| 0594131 | 10/1993 | (EP) . |
| 2684633 * | 6/1993 | (FR) ...................................... 29/530 |
| 628 868 | 3/1947 | (GB) . |
| 2090394 | 11/1980 | (GB) . |
| 2061 196 | 5/1981 | (GB) . |
| 2067478 * | 7/1981 | (GB) ................................. 52/731.6 |
| 2197 267 | 5/1988 | (GB) . |
| 01069308 | 3/1989 | (JP) . |
| 01069309 | 3/1989 | (JP) . |
| 02206537 | 8/1990 | (JP) . |
| 5389920 | 2/1993 | (JP) . |
| WO 89/06595 | 7/1989 | (WO) . |
| WO 93/05103 | 3/1993 | (WO) . |
| WO96/37400 | 11/1996 | (WO) . |

Primary Examiner—Laura A. Callo
(74) Attorney, Agent, or Firm—Bove Connolly

(57) ABSTRACT

A hollow reinforced structural member has a bulkhead having a layer of thermally expanded resin disposed between opposed side walls. A sleeve is retained within the resin layer and is oriented perpendicular to the longitudinal axis of the reinforce structural member. The sleeve is an alignment with bolt holes in opposite sides of the reinforced structure such that a bolt can be inserted there through. A component can then be bolted to the reinforced structural member at the site of the reinforcement. The invention not only increases the strength of the part, but also reduces vibration and noise transmission.

25 Claims, 2 Drawing Sheets

U.S. PATENT DOCUMENTS

| | | |
|---|---|---|
| 4,610,836 | 9/1986 | Wycech . |
| 4,751,249 | 6/1988 | Wycech . |
| 4,836,516 | 6/1989 | Wycech . |
| 4,853,270 | 8/1989 | Wycech . |
| 4,861,097 | 8/1989 | Wycech . |
| 4,901,500 | 2/1990 | Wycech . |
| 4,906,148 | 3/1990 | Schule . |
| 4,908,930 | 3/1990 | Wycech . |
| 4,922,596 | 5/1990 | Wycech . |
| 4,923,902 | 5/1990 | Wycech . |
| 4,978,562 | 12/1990 | Wycech . |
| 4,995,545 | 2/1991 | Wycech . |
| 5,005,887 | 4/1991 | Kelman . |
| 5,122,398 | 6/1992 | Seiler et al. . |
| 5,124,186 | 6/1992 | Wycech . |
| 5,255,487 | 10/1993 | Wieting et al. . |
| 5,575,526 | 11/1996 | Wycech . |
| 5,682,678 | 11/1997 | Gallagher et al. . |
| 5,755,486 * | 5/1998 | Wycech ................. 296/188 |

\* cited by examiner

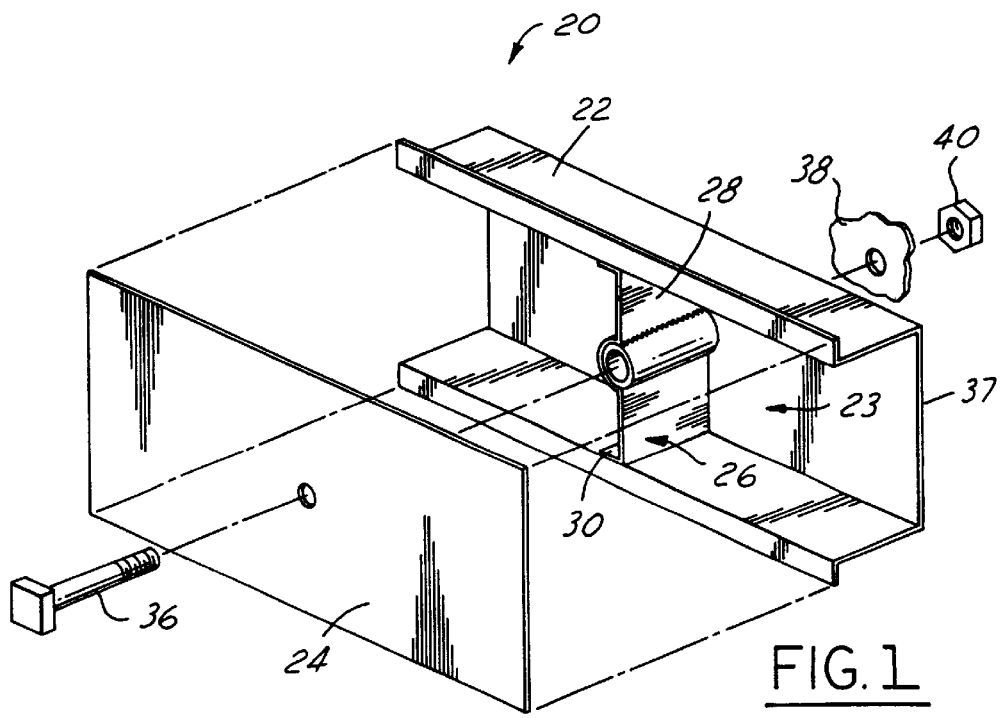
FIG. 1 *(Prior Art)*
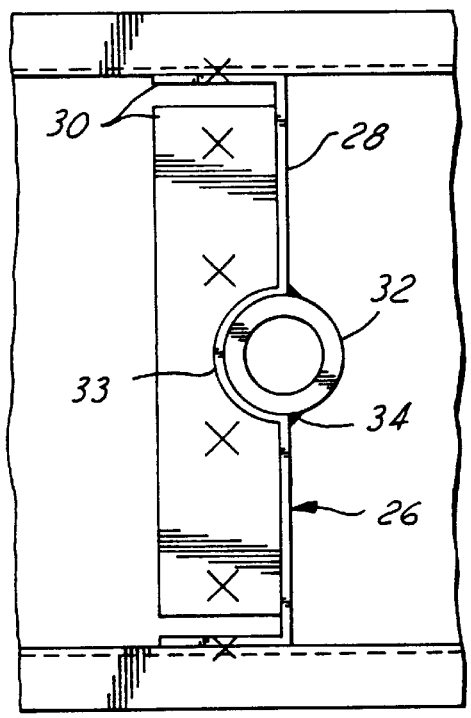
FIG. 2 *(Prior Art)*

LAMINATE STRUCTURAL BULKHEAD

CROSS-REFERENCE TO RELATED APPLICATION

This application is based on provisional application Ser. No. 60/053,118, filed Jul. 18, 1997.

BACKGROUND OF THE INVENTION

Particularly in automotive applications, box sections such as main frame rails are subjected to considerable stress forces where cross members are bolted to the rails. For example, when engine cradles are bolted to main frame rails they produce joints that are susceptible to durability cracking over time. In addition, the bolts which hold such components in place may loosen due to vibration at the joint. Moreover, conventional structures create a "noise path" which extends from the vehicle wheels and engine through the frame and into the passenger compartment.

As will be appreciated by those skilled in the art, in order to bolt a heavy component to the side of a rail section it is necessary to create a reinforced region or support structure at the site of attachment of the bolt. One approach which is used in the art is to provide a stamped bulkhead which supports a metal bushing. The bulkhead generally has three flange portions which are spot welded to the rail C-section. More specifically, the stamped bulkhead has a wall portion that extends from one wall of the rail section to the opposite wall or cap. Thus, the bulkhead forms a partition in the channel or cavity defined by the rail. In order to secure this wall portion in place, the bulkhead has three surfaces or flanges that are perpendicular to the bulkhead wall portion; that is, the bulkhead is in essence a shallow rectangular box that is open on one side. These three surfaces mate with the inner surfaces of the rail and are spot welded in place.

In order to utilize the bulkhead as a support for the cross structure which is attached thereto, it is designed to position a metal bushing that is spot welded to the bulkhead stamping. A bolt then passes through the bushing and secures the cross structure to the rail at the bulkhead-reinforced region. This conventional approach will be more fully illustrated hereinafter.

While the conventional bulkhead design does serve to reinforce the rail section at the attachment site of the cross member, it generally requires large gauge bushings and stampings and can actually increase unwanted vibration and noise. Moreover, the through-bolt, bushing, metal stamping and rail section essentially perform as discrete elements more than a unitary, integral reinforcement structure. This results not only in the above-mentioned increase in vibration and noise, but also fails to provide full reinforcement of the rail, resulting in metal fatigue at the joint and, in particular, at weld locations.

The present inventor has developed a number of approaches to the reinforcement of hollow metal parts such as: a reinforcing beam for a vehicle door which comprises an open channel-shaped metal member having a longitudinal cavity which is filled with a thermoset or thermoplastic resin-based material; a hollow torsion bar cut to length and charged with a resin-based material; a precast reinforcement insert for structural members which is formed of a plurality of pellets containing a thermoset resin with a blowing agent, the precast member being expanded and cured in place in the structural member; a composite door beam which has a resin-based core that occupies not more than one-third of the bore of a metal tube; a hollow laminate beam characterized by high stiffness-to-mass ratio and having an outer portion which is separated from an inner tube by a thin layer of structural foam; an I-beam reinforcement member which comprises a preformed structural insert having an external foam which is then inserted into a hollow structural member; and a metal w-shaped bracket which serves as a carrier for an expandable resin which is foamed in place in a hollow section.

None of these prior approaches, however, deal specifically with solving the problems associated with conventional reinforcing bulkheads in rail sections at cross member attachment sites. The present invention solves many of the problems inherent in the prior art.

It is an object of the present invention to provide a reinforced hollow metal structure which incorporates a bushing and a stamping in a bulkhead structure in a manner in which the components of the bulkhead work together as an integral unit with the reinforced structure.

It is a further object of the invention to provide a reinforced metal box section which provides greater strength to the section without significantly increasing vibration and noise transmission levels.

It is a further object of the present invention to provide a reinforced frame rail section at the attachment of a cross member such as an engine cradle in a manner in which stress forces are distributed over a region of the reinforced rail rather than at the discrete welds and in which noise and vibration are dampened.

These and other objects and advantages of the invention will be more fully appreciated in accordance with the detailed description of the preferred embodiments of the invention and the drawings.

SUMMARY OF THE INVENTION

In one aspect the present invention provides a reinforced structure. The reinforced structure includes a hollow structural member and a reinforcing member disposed therein. The reinforcing member has a pair of opposed walls. A layer of thermally expanded polymer is disposed between and is bonded to the opposed walls. This layer of polymer is also bonded directly to the structural member. A sleeve extends through the polymer parallel with and between the opposed walls. The polymer is bonded to the sleeve and the sleeve defines a passage through the polymer. The reinforced structure has holes that are in alignment with the ends of the sleeve. A bolt is then used to secure a component to the structural member. Thus, the hollow structural member is reinforced locally in the present invention at that position by virtue of the reinforcing member. The polymer is expanded in place by heating the entire structure after assembly, where it expands to fill gaps between the reinforcing structure and the structural member and bonds the reinforcing structure to the structural member.

In another aspect the reinforced structure of the present invention is a motor vehicle rail such as a front rail where local reinforcement for the attachment of components such as an engine cradle is required. In this aspect, the invention reduces vibration and noise transmission as well as increases the strength of the part at the site of the reinforcement.

In still another aspect the sleeve is a thin wall metal bushing, the opposed walls are metal stampings with flanges which are welded to the structural member and the polymer is a thermally expanded epoxy resin which contains hollow microspheres for density reduction.

In still another aspect the present invention provides method of reinforcing a structural member having a longitudinal channel. In this aspect a laminated structure having two opposed walls separated by a layer of thermally expandable polymer is placed in the channel of a rail section or the like. The laminated structure has a sleeve disposed in the layer of thermally expandable polymer. The sleeve defines a passage perpendicular to the opposed walls. The laminated structure also has a pair of end flanges. The laminated structure is placed in the longitudinal channel such that said sleeve passage is perpendicular to the longitudinal channel. The laminated structure is then welded to the structural member at the flanges. The entire structure is then heated to a temperature effective to activate the blowing agent of the polymer and thereby thermally expand the polymer such that it bonds the laminated structure to the structural member.

BRIEF DESCRIPTION OF THE DRAWINGS

FIG. 1 is a diagrammatic exploded perspective view of a conventional prior art bulkhead reinforcement structure;

FIG. 2 is a diagrammatic front elevational view of the structure of FIG. 1 with the cap plate removed;

DETAILED DESCRIPTION

Figure 3:
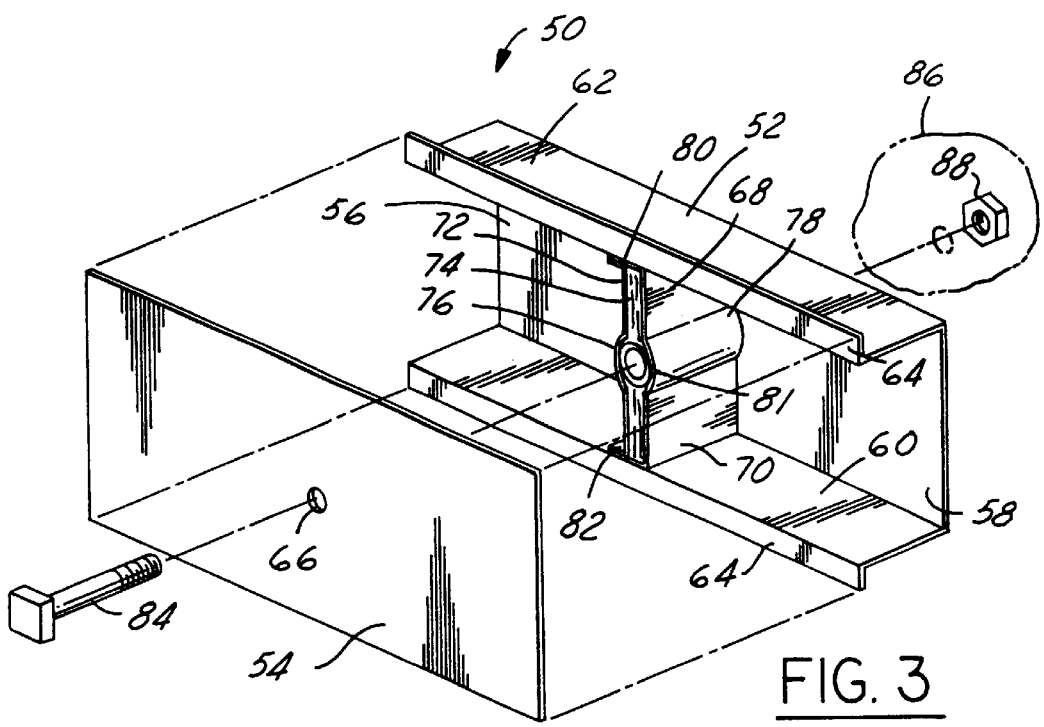
FIG. 3 is a diagrammatic exploded perspective view of the reinforced rail section of the present invention illustrating the construction of the reinforcing laminate bulkhead.

Referring now to FIGS. 1 and 2 of the drawings, prior art front rail section 20 is shown having C-section 22 that defines channel 23 and which receives cap plate 24. Bulkhead stamping 26 is seen having vertical wall 28 and flanges 30. Bushing 32 is welded to wall 28 at an arcuate bend 33 in wall 28. Flanges 30 are welded to section 22 to hold bulkhead 26 in place. Bolt 36 extends through cap 24, bushing 32 and vertical wall 37 of section 22 and then through a component 38 which is to attached to rail 20. Nut 40 is then attached to bolt 36 to secure component 38 in place. This is representative of the prior art and suffers from the drawbacks described above, i.e. inadequate reinforcement, inadequate sound dampening and vibration problems.

Turning now to FIG. 3 of the drawings, reinforced structure 50 is shown in one embodiment as a reinforced front rail of an automotive frame and includes frame rail C-section 52 which is closed by cap plate 54 such that channel or cavity 56 is defined in reinforced structure 50. In other words the frame rail is hollow. C-section 52 includes vertical wall portion 58 and opposed wall portions 60 and 62. Each opposed wall portion 60,62 has a flange portion 64 of the attachment of cap plate 54 by welding or the like at the flange areas. Reinforcing member or bulkhead 68 is seen disposed in channel 56 of C-section 52 and has a first wall or side 70 and a second wall or side 72. Walls 70 and 72 are parallel to one another and are separated by polymer layer 74; that is, polymer layer 74 is disposed between walls 70 and 72.

Figure 4:
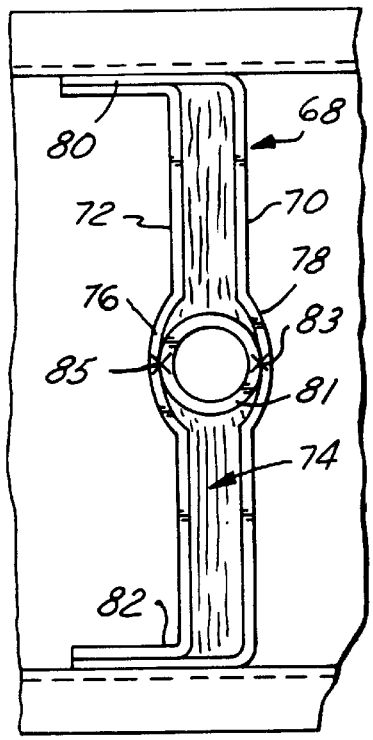
FIG. 4 is a diagrammatic front elevational view of the structure shown in FIG. 3 with the cap plate removed.
Figure 5:
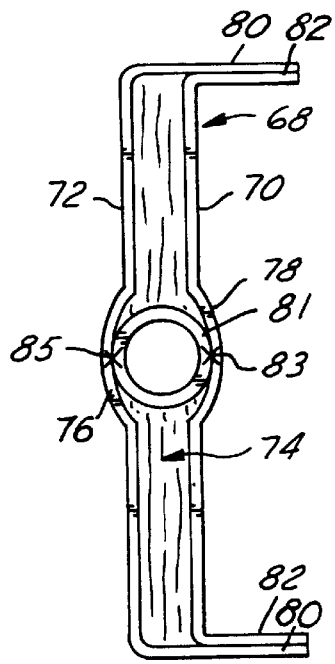
FIG. 5 is a diagrammatic back view of the bulkhead portion of FIGS. 3 and 4.

As best seen in FIGS. 4 and 5 of the drawings, each wall 70,72 has an associated arcuate portion (76 for wall 72 and 78 for wall 70) which is designed to accommodate sleeve 81 in a manner to be more fully described hereinafter. Each arcuate portion 76,78 is approximately midway along the length of each wall 70,72 and can be viewed as a curved inner surface. Sleeve 81 is a metal bushing or the like and, as best seen in FIG. 4 of the drawings is spot welded to walls 70 and 72 at weld points 83 and 85. Polymer layer 74 essentially envelopes sleeve 81 as shown in FIG. 4.

Bulkhead 68 is secured in place in channel 56 by virtue of attachment flanges 80 and 82 which extend from walls 70 and 72 at 90 degree angles. That is, each wall 70, 72 has at each end a bent portion that mates with a similar portion on the opposed wall to form an attachment flange 80,82 that is welded on side wall 60,62, respectively.

The width of walls 70 and 72 (distance between vertical wall 58 and cap plate 54) is such that bulkhead 68 is in contact with vertical wall 58 and cap plate 54. Accordingly, bolt 84 extends through cap plate 54 at hole 66, through sleeve 81 and through a corresponding hole in vertical wall 58 (not shown). Bolt 84 then extends through a hole in a cross member such as engine cradle 86 which is shown in phantom as fragment 86. Nut 88 is then secured on bolt 84 to secure engine cradle 86 onto reinforced structure 50.

Bulkhead 68 is a relatively light weight structure for the amount of strength added to the frame rail. Walls 70 and 72 can be formed of thin steel stampings, for example from 0.02 to about 0.08 inch in thickness. Mild to medium strength steel is particularly preferred. Also, sleeve 81 which is preferably a metal bushing may b a thin wall tube having a wall thickness of from about 0.08 to about 0.2 inch and is preferably mild steel. Of course, these dimensions are merely illustrative and are not intended to limit the full scope of the invention as defined in the claims. Each attachment flange 80,82 is generally from about 15 percent to about 30 percent of the length of walls 70,72. The outer diameter of sleeve 81 will typically be from about ½ to about 1 inch. The width of polymer layer 74 will be a function of the distance between walls or plates 70 and 72 and will generally be between about 0.1 and about 0.4 inch. It is to be understood that the entire depth of bulkhead 68 is filled with polymer layer 74; that is, as shown in FIG. 5 of the drawings polymer layer 74 extends from the front of bulkhead 68 to the back.

The polymer used to form polymer layer 74 is a resin based material which is thermally expandable. A number of resin-based compositions can be utilized to form thermally expanded layer 74 in the present invention. The preferred compositions impart excellent strength and stiffness characteristics while adding only marginally to the weight. With specific reference now to the composition of layer 74, the density of the material should preferably be from about 20 pounds per cubic feet to about 50 pounds per cubic feet to minimize weight. The melting point, heat distortion temperature and the temperature at which chemical breakdown occurs must also be sufficiently high such that layer 74 maintains its structure at high temperatures typically encountered in paint ovens and the like. Therefore, layer 74 should be able to withstand temperatures in excess of 320 degrees F. and preferably 350 degrees F. for short times. Also, layer 74 should be able to withstand heats of about 90 degrees F. to 200 degrees F. for extended periods without exhibiting substantial heat-induced distortion or degradation.

The foam 74 may be initially applied to one or both walls 70,72 and then expand into intimate contact with both walls and with sleeve 81. Advantageously heat from the paint oven may be used to expand foam 74 when it is heat expandable.

In more detail, in one particularly preferred embodiment thermally expanded structural foam for layer 74 includes a synthetic resin, a cell-forming agent, and a filler. A synthetic resin comprises from about 40 percent to about 80 percent by weight, preferably from about 45 percent to about 75 percent by weight, and most preferably from about 50 percent to about 70 percent by weight of layer 74. Most preferably, a portion of the resin includes a flexible epoxy. As used herein, the term "cell-forming agent" refers generally to agents which produce bubbles, pores, or cavities in layer 74. That is, layer 74 has a cellular structure, having numerous cells disposed throughout its mass. This cellular structure provides a low-density, high-strength material, which provides a strong, yet lightweight structure. Cell-forming agents which are compatible with the present invention include reinforcing "hollow" microspheres or microbubbles which may be formed of either glass or plastic. Also, the cell-forming agent may comprise a blowing agent which may be either a chemical blowing agent or a physical blowing agent. Glass microspheres are particularly preferred. Where the cell-forming agent comprises microspheres or macrospheres, it constitutes from about 10 percent to about 50 percent by weight, preferably from about 15 percent to about 45 percent by weight, and most preferably from 20 percent to about 40 percent by weight of the material which forms layer 74. Where the cell-forming agent comprises a blowing agent, it constitutes from about 0.5 percent to about 5.0 percent by weight, preferably from about 1 percent to about 4.0 percent by weight, and most preferably from about 1 percent to about 2 percent by weight of thermally expanded structural foam layer 74. Suitable fillers include glass or plastic microspheres, fumed silica, calcium carbonate, milled glass fiber, and chopped glass strand. A thixotropic filler is particularly preferred. Other materials may be suitable. A filler comprises from about 1 percent to about 15 percent by weight, preferably from about 2 percent to about 10 percent by weight and most preferably from about 3 percent to about 8 percent by weight of layer 74.

Preferred synthetic resins for use in the present invention include thermosets such as epoxy resins, vinyl ester resins, thermoset polyester resins, and urethane resins. It is not intended that the scope of the present invention be limited by molecular weight of the resin and suitable weights will be understood by those skilled in the art based on the present disclosure. Where the resin component of the liquid filler material is a thermoset resin, various accelerators, such as imidazoles and curing agent, preferably dicyandiamide may also be included to enhance the cure rate. A functional amount of accelerator is typically from about 0.5 percent to about 2.0 percent of the resin weight with corresponding reduction in one of the three components, resin, cell-forming agent or filler. Similarly, the amount of curing agent used is typically from about 1 percent to about 8 percent of the resin weight with a corresponding reduction in one of the three components, resin, cell-forming agent or filler. Effective amounts of processing aids, stabilizers, colorants, UV absorbers and the like may also be included in layer. Thermoplastics may also be suitable.

In the following table, a preferred formulation for layer 74 is set forth. It has been found that this formulation provides a material which full expands and cures at about 320 degrees F. and provides excellent structural properties. All percentages in the present disclosure are percent by weight unless otherwise specifically designated.

| INGREDIENT | PERCENTAGE BY WEIGHT |
| --- | --- |
| EPON 828 (epoxy resin) | 37.0 |
| DER 331 (flexible epoxy resin) | 18.0 |
| DI—CY (dicyandiamide curing agent) | 4.0 |
| Imidazole (accelerator) | 0.8 |
| FUMED SILICA (thixotropic filler) | 1.1 |
| Celogen AZ199 (asodicarbonamide blowing agent) | 1.2 |
| 83 MICROS (glass microspheres) | 37.0 |
| WINNOFIL CALCIUM CARBONATE ($CaCO_3$ filler) | 0.9 |

While the invention has been described primarily in connection with vehicle parts, it is to be understood that the invention may be practiced as part of other products, such as aircrafts, ships, bicycles or virtually anything that requires energy for movement. Similarly, the invention may be used with stationary or static structures, such as buildings, to provide a rigid support when subjected to vibration such as from an earthquake or simply to provide a lightweight support for structures subjected to loads. Additionally, while the invention has been described primarily with respect to heat expandable foams and with respect to metal parts such as the inner tubes 16, 58 and 76, other materials can be used. For example, the foam could be any suitable known expandable foam which is chemically activated into expansion and forms a rigid structural foam. The bulkhead walls 70,70 and sleeve 81 could be made of materials other than metal such as various plastics or polymeric materials or various wood type fibrous materials having sufficient rigidity to function as a back drop or support for the foam. Where a heat expandable foam is used the bulkhead walls and sleeve should be able to withstand the heat encountered during the heat curing. Where other types of foam materials are used, however, it is not necessary that the bulkhead walls and sleeve be able to withstand high temperatures. Instead, the basic requirement for the bulkhead walls and sleeve is that it have sufficient rigidity to function in its intended manner. It is also possible, for example, to use as the bulkhead walls and sleeve materials which in themselves become rigid upon curing or further treatment. The invention may also be practiced where the bulkhead walls and sleeve are made of materials other than metal. It is preferred, however, that materials be selected so that the thin unexpanded foam upon expansion forms a strong bond with the bulkhead walls and sleeve so that a structural composition will result.

While particular embodiments of this invention are shown and described herein, it will be understood, of course, that the invention is not to be limited thereto since many modifications may be made, particularly by those skilled in this art, in light of this disclosure. It is contemplated, therefore, by the appended claims, to cover any such modifications as fall within the true spirit and scope of this invention.

What is claimed is:

1. A reinforced structure, comprising a structural member defining a space; a reinforcing member disposed in said space, said reinforcing member having first and second opposed walls; a layer of expanded polymer disposed between and bonded to said first and second opposed walls, said expanded polymer also being bonded to said structural member; a sleeve extending through said expanded polymer, said sleeve being hollow and of uninterrupted closed cross section, said sleeve being disposed between said first and second opposed walls, said expanded polymer being bonded to said sleeve; and said sleeve defining a passage adapted to receive a bolt.

2. The reinforced structure recited in claim 1, further including a bolt which extends through said structural member and which extends through said sleeve.

3. The reinforced structure recited in claim 1, wherein said reinforced structure is an automotive rail section.

4. The reinforced structure recited in claim 3, wherein said automotive rail section is a front rail.

5. The reinforced structure recited in claim 4, wherein said rail section is U-shaped with outwardly extending flanges, and a cap plate secured to said flanges.

6. The reinforced structure recited in claim 1, wherein said opposed walls are welded to said structural member.

7. The reinforced structure recited in claim 1, wherein said sleeve is welded to at least one of said first and second walls.

8. The reinforced structure recited in claim 1, wherein said structural member has a pair of through holes in alignment with said bolt-receiving passage of said sleeve.

9. The reinforced structure recited in claim 1, wherein said layer of expanded polymer is epoxy.

10. The reinforced structure recited in claim 1, wherein said sleeve is substantially parallel with said first and second opposed walls.

11. The reinforced structure recited in claim 1, wherein said layer of expanded polymer is thermally expanded foam-formed from, in percentage by weight, from about 40% to about 60% resin; from about 10% to about 50% microspheres; from about 0.5% to about 5% blowing agent; from about 1% to about 15% filler; from about 0.5% to about 2.0% accelerator and from about 1% to about 8% curing agent.

12. A reinforced structural member, comprising: a rail having opposed side walls and defining a longitudinal channel, said longitudinal channel lying along a longitudinal axis; a laminate reinforcement member disposed in said channel perpendicular to said longitudinal channel, said laminated reinforcement member having two opposed retaining walls separated by a layer of expanded polymer; a sleeve disposed between said opposed retaining walls and defining a passage, said sleeve being hollow and of uninterrupted closed cross section; said layer of expanded polymer being bonded to said opposed retaining walls and to said sleeve; and a bolt extending through said rail and said sleeve.

13. The reinforced structural member of claim 12, wherein said rail is made of steel, and said retaining walls having flanges welded to said steel rail.

14. The reinforced structural member recited in claim 12, wherein said opposed retaining walls each include an inner convex surface at the position of said sleeve.

15. The reinforced structure recited in claim 12, wherein said sleeve is welded to at least one of said opposed retaining walls.

16. The reinforced structure recited in claim 12, wherein said layer of expanded polymer is comprised of an epoxy.

17. The reinforced structure recited in claim 16, wherein said expanded polymer is thermally expanded and further contains microspheres which reduces the density of said expanded polymer.

18. The reinforced structural member recited in claim 12, wherein said laminated reinforcement member has a flange portion at each end thereof.

19. A method of reinforcing a structural member having a longitudinal channel there through, comprising the steps of: providing a structural member which defines a longitudinal channel; providing a laminated structure having two opposed walls separated by a layer of expandable polymer; said laminated structure having a sleeve disposed in said layer of expandable polymer, said sleeve being of uninterrupted closed cross section and defining a passage between said opposed walls; placing said laminated structure in said longitudinal channel such that said sleeve passage is substantially perpendicular to said longitudinal channel; securing said laminated structure to said structural member; and actuating said polymer to expand into intimate contact with the opposed walls and to the sleeve.

20. The method recited in claim 19, wherein the polymer is thermally expandable, and heating said structural member to a temperature sufficient to thermally expand said layer of thermally expandable polymer such that said polymer bonds said laminated structure to said structural member.

21. The reinforced structure recited in claim 20, wherein said expandable polymer further includes microspheres which reduce the density of said expandable polymer.

22. The method recited in claim 19, wherein said structural member is an automotive rail.

23. A reinforced structural member formed by the process of claim 19.

24. A reinforced structure, comprising a structural member defining a space; a reinforcing member disposed in said space, said reinforcing member having first and second opposed walls; a layer of thermally expandable polymer disposed between and bonded to said first and second opposed walls, said thermally expandable polymer also being bonded to said structural member; wherein said layer of thermally expandable polymer includes, in percentage by weight 37% epoxy resin, flexible epoxy resin, dicyandiamide curing agent, imidizole accelerator, fumed silica, azodicarbonamide blowing agent, glass microspheres, and calcium carbonate; a sleeve extending through said thermally expandable polymer, said sleeve being disposed between said first and second opposed walls, said sleeve being hollow and of uninterrupted closed cross section, said thermally expandable polymer being bonded to said sleeve; and said sleeve defining a passage adapted to receive a bolt.

25. The reinforced structure recited in claim 24 wherein said layer of thermally expandable polymer includes, in percentage by weight, 37% epoxy resin, 18% flexible epoxy resin, 4% dicyandiamide curing agent, 0.8% imidizole accelerator, 1.1% fumed silica, 1.2% azodicarbonamide blowing agent, 37% glass microspheres, and 0.9% calcium carbonate.

* * * * *